(12) United States Patent
Pop

(10) Patent No.: US 10,020,078 B2
(45) Date of Patent: Jul. 10, 2018

(54) COMPOSITE FUEL ROD CLADDING

(71) Applicant: AREVA Inc., Lynchburg, VA (US)

(72) Inventor: Mihai G. M. Pop, Alexandria, VA (US)

(73) Assignee: Framatome Inc., Lynchburg, VA (US)

( * ) Notice: Subject to any disclaimer, the term of this patent is extended or adjusted under 35 U.S.C. 154(b) by 1307 days.

(21) Appl. No.: 14/250,270

(22) Filed: Apr. 10, 2014

(65) Prior Publication Data

US 2014/0307845 A1    Oct. 16, 2014

Related U.S. Application Data

(60) Provisional application No. 61/810,618, filed on Apr. 10, 2013.

(51) Int. Cl.
G21C 3/30 (2006.01)
G21C 3/07 (2006.01)
B32B 18/00 (2006.01)

(52) U.S. Cl.
CPC ............... G21C 3/07 (2013.01); B32B 18/00 (2013.01); C04B 2235/5244 (2013.01); C04B 2237/365 (2013.01); C04B 2237/38 (2013.01); Y02E 30/40 (2013.01)

(58) Field of Classification Search
CPC ... G21C 3/00; G21C 3/06; G21C 3/07; G21C 3/16; G21C 3/18; G21C 3/20
See application file for complete search history.

(56) References Cited

U.S. PATENT DOCUMENTS

| 5,182,077 | A | 1/1993 | Feinroth |
| 5,762,831 | A | 6/1998 | Viallard et al. |
| 5,805,657 | A | 9/1998 | Heubeck |
| 5,999,585 | A | 12/1999 | Dehaudt et al. |
| 6,190,725 | B1 | 2/2001 | Lee et al. |
| 6,221,286 | B1 | 4/2001 | Dehaudt et al. |
| 6,246,740 | B1 * | 6/2001 | Maruyama ............ C04B 35/571 376/327 |
| 6,665,366 | B2 | 12/2003 | Aujollet et al. |
| 7,587,018 | B2 | 9/2009 | McCoy |
| 7,666,470 | B1 | 2/2010 | McCoy |
| 7,700,202 | B2 | 4/2010 | Easler et al. |
| 7,899,146 | B1 | 3/2011 | Youchison et al. |
| 8,243,871 | B2 | 8/2012 | Hrovat et al. |

(Continued)

FOREIGN PATENT DOCUMENTS

KR    101189170    10/2012

OTHER PUBLICATIONS

PCT/US2014/033676 International Search Report.
(Continued)

*Primary Examiner* — Marshall P O'Connor
(74) *Attorney, Agent, or Firm* — Davidson, Davidson & Kappel, LLC

(57) ABSTRACT

A fuel rod for a nuclear fission reactor is disclosed and claimed. The fuel rod includes an elongate hollow cladding configured to retain a nuclear fuel therein. The cladding includes an elongate hollow tube. Fiber layers are positioned around the outside surface of the tube or within the tube forming an integral part thereof. Both the tube and the fibers are formed of a ceramic material. A fuel assembly including a plurality of such fuel rods is also disclosed and claimed.

24 Claims, 3 Drawing Sheets

(56) References Cited

U.S. PATENT DOCUMENTS

| | | | |
|---|---|---|---|
| 2004/0052326 A1 | 3/2004 | Blanpain et al. | |
| 2006/0039524 A1* | 2/2006 | Feinroth | C04B 35/806 |
| | | | 376/409 |
| 2006/0227924 A1 | 10/2006 | Hallstadius et al. | |
| 2007/0064861 A1 | 3/2007 | Sterbentz | |
| 2007/0153966 A1 | 7/2007 | Astafiev | |
| 2007/0189952 A1 | 8/2007 | Easler et al. | |
| 2009/0032178 A1 | 2/2009 | Feinroth | |
| 2009/0080591 A1 | 3/2009 | Kuczynski | |
| 2009/0129533 A1 | 5/2009 | Kuczynski | |
| 2010/0120604 A1 | 5/2010 | Easler et al. | |
| 2010/0296621 A1 | 11/2010 | Broli et al. | |
| 2011/0051876 A1 | 3/2011 | Ahlfeld et al. | |
| 2011/0051881 A1 | 3/2011 | Ahlfeld et al. | |
| 2011/0091004 A1 | 4/2011 | Farmer et al. | |
| 2011/0170653 A1 | 7/2011 | Cabrero et al. | |
| 2011/0268243 A1 | 11/2011 | Hallstadius et al. | |
| 2011/0317794 A1 | 12/2011 | Venneri et al. | |
| 2012/0140867 A1 | 6/2012 | Venneri et al. | |
| 2012/0183116 A1 | 7/2012 | Hollenbach et al. | |
| 2012/0201343 A1 | 8/2012 | Ravenet | |

OTHER PUBLICATIONS

PCT/US2014/033676 Written Opinion of the International Searching Authority.
Idaho State University Advanced LWR Fuel paper, Apr. 2013.
J. Dobisesky et al., "PWR Cores with Silicon Carbide Cladding," International Topical Meeting on Advances in Reactor Physics (PHYSOR), Knoxville, Apr. 2012.

* cited by examiner

COMPOSITE FUEL ROD CLADDING

CROSS-REFERENCE TO RELATED APPLICATIONS

This patent application claims the benefit of U.S. Provisional Patent Application No. 61/810,618 filed on Apr. 10, 2013, which is incorporated herein by reference in its entirety.

BACKGROUND OF THE INVENTION

1. Field of the Invention

The present invention relates to nuclear fuel assemblies for use in a nuclear fission reactor, and, more particularly, the present invention relates to nuclear fuel assemblies with nuclear fuel rods formed with a cladding of a composite ceramic material.

2. Description of the Related Art

During operation of a nuclear fission reactor, the function of the fuel rods within a fuel assembly is to allow transmission of the heat resulting from the fission reaction inside the fuel pellets mounted within the fuel rod while separating the radioactive material from the streaming cooling fluid, which in light water reactors is water. A nuclear fuel rod typically includes a cladding tube that houses a. stack of fuel pellets formed of uranium oxide, plutonium oxide, or a mixture thereof, and end plugs that seal both the upper and lower ends of the tube. During operation, the fuel rod claddings are subjected to heat, irradiation from the fuel pellets, and a chemical reactive environment from the streaming medium.

The fuel rod cladding in light water reactors is usually manufactured from a zirconium alloy, Zirconium alloys are used in fuel rod cladding due to their good mechanical properties, low neutron cross-section, and relatively high corrosion resistance. Different types of zirconium alloys are available for different types of light water reactors.

In spite of the favorable properties of the zirconium alloys, fuel rod claddings manufactured from a zirconium alloy are affected by the environment in the reactor (heat, radiation, chemistry environment, amount of deposition, and location of deposition on fuel rods) such that the material expands differently, or in a non-uniform manner. The expansion of the zirconium alloy creates a permanent deformation of fuel rods, for example an elongation, such that the fuel rod dimensions in relation to its original dimensions change along the life of the fuel assembly and are different from fuel rod to fuel rod. The expansion of the zirconium alloy arises anisotropically, which results in an originally straight fuel assembly becoming bent during its life in a number of directions away from its original longitudinal axis.

The permanent deformation of the zirconium alloy in the fuel rod claddings is induced by heat, irradiation from the fuel rods, and by corrosion and hydrogen pick up. The corrosion is a function of the type of chemical environment, the type of deposition, and the quantity of deposition on each rod cladding at each location. The hydrogen pick up is a function of the cooling fluid chemical environment and the deposition resulting on fuel rod claddings. Hydrogen pick up is concentrated in the form of hydrides in the zirconium alloy, which, in addition to the permanent deformation, also results in a weakening of the mechanical properties of the fuel rod cladding. It is to be noted that the quantities of hydrides inside the fuel rod cladding resulting from the hydrogen pick up varies azimuthally and along the longitudinal axis of the fuel rod, creating different mechanical properties of the fuel rod cladding at every location along the fuel rod.

In light water reactors, the water is guided along the fuel rods from the bottom to the top of the reactor. Light water reactors are controlled by means of control elements, typically control blades that are displaced into and displaced out of positions between the fuel assemblies mounted in fuel channels for boiling water reactors (BWRs) and control rods that are displaced into and displaced out of the guide thimbles of the fuel assemblies for pressurized water reactors (PWRs). Due to the fuel assembly's great length, even a small inhomogeneous permanent deformation of the fuel rods may create a large bending of the fuel assembly. Any permanent deformation of a fuel assembly results in difficulties in movement of the control elements since there could be, for example in BWRs, frictional contact between the control blades and fuel channels resulting in "slow to settle" or totally inactive control blades.

The melting temperature of zirconium alloys is around 1750° C., substantially below the maximum temperatures reached in a dry core (2400° C.) during a beyond conceivable limits accident resulting in a total dry-out core (that is, no water available to cool the nuclear reactor). This condition would allow dissipation of radioactive materials in the melt resulting during a beyond conceivable limits accident inside the reactor vessel, and create higher impacts to the environment and to the cost and duration of recovery after such an accident. While the probability of such an accident is extremely small, it stresses the importance of introducing better materials than zirconium alloys for the fuel rod cladding as the ultimate barrier against the dissipation of large quantities of radioactive materials in the environment.

SUMMARY OF THE INVENTION

The present invention relates to a fuel assembly, part of a nuclear fission reactor, comprising a bottom nozzle, an upper nozzle, and a plurality of elongate fuel rods mounted between the two nozzles. The fuel rods pass through a number of spacer grids mounted between the two nozzles, which fuel rods each comprises nuclear fuel organized in fuel pellets mounted inside fuel rod claddings and are adapted to transfer energy to a streaming medium during operation of the nuclear reactor.

A fuel rod of the present invention includes an elongate hollow cladding, configured to retain a nuclear fuel therein. The nuclear fuel is typically provided in fuel pellets made of fissile material including uranium, plutonium, or a mixture thereof. The fuel cladding is formed of a tube made of a ceramic material, with silicon carbide being a preferred ceramic. The ceramic material is chosen such that it can withstand temperatures and radiation typical of an operating nuclear reactor without deformation.

The fuel cladding further includes one or more fiber layers positioned or spun about the tube. Each fiber layer is also formed of at least one fiber of a ceramic material, and preferably of the same material as the tube. The fiber layers provide added strength and enhance the structural integrity of the fuel cladding. The fuel cladding may further include a residual substance such as boron or graphite to reduce friction between the fibers. This lubricating residual substance can be an integral part of the fibers themselves, or an added substance separate from the fiber layers. The mass of the residual substance preferably does not exceed 8% of a total mass of the fibers.

The fibers may be positioned about the tube in a number of ways. For example, the fibers may be wrapped around the tube such that the fiber layers are not parallel to the longitudinal axis of the tube. The fibers preferably are wrapped around the tube at an angle of approximately 30° to 70° relative the tube longitudinal axis. The overall strength of the fuel cladding is increased if the orientation of the fiber layers varies, and thus adjacent fiber layers preferably are positioned at different angles. other words, adjacent fiber layers are not parallel. A relative angle of 75° to 105° between adjacent fiber layers is preferred. The fibers may be grouped together as a mesh. The fibers may be provided as an integral part of the tube rather than being wrapped about the outer surface of the tube.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
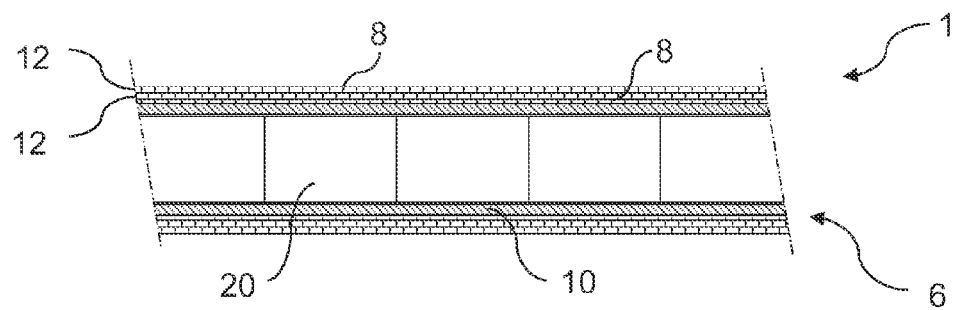
FIG. 1 shows a cross-sectional view of a preferred composite fuel rod of the present invention.
Figure 2:
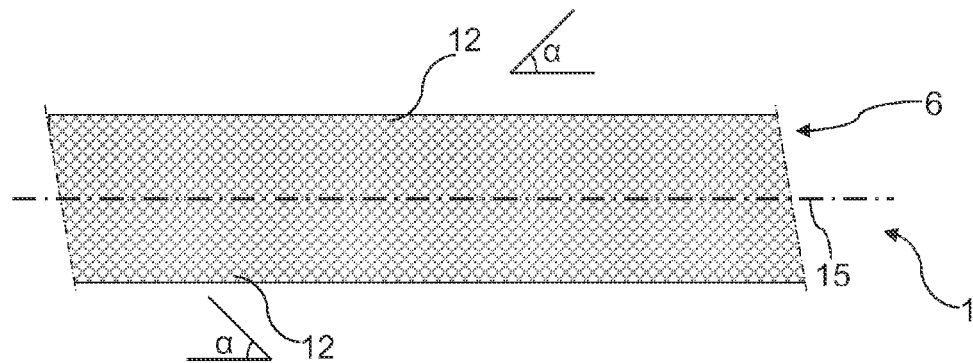
FIG. 2 shows the fuel rod of FIG. 1, with only two fiber layers for clarity of explanation.

The present invention provides nuclear fuel rods 1 formed of a composite ceramic cladding 6 configured to retain nuclear fuel pellets 20 therein in a known manner. Silicon carbide (SiC) is a preferred ceramic material. As illustrated in FIG. 1, the composite ceramic cladding 6 comprises a tube 10 covered by a number of layers 12 of fibers 8 spun around the tube 10. Preferably, the fiber layers 12 are placed about the tube 10 in varying directions, enhancing the strength of the fuel rod 1. For example, as shown in FIG. 2, the fiber layers 12 may be arranged iii a direction non-parallel with the fuel rod longitudinal axis 15 at an angle α that is between approximately 30° to 70° relative the longitudinal axis 15. (It should be noted that for the sake of clarity, only a single fiber 8 per fiber layer 12 is illustrated in FIG. 2.) Subsequent fiber layers 12 preferably are placed atop the previously placed fiber layer(s) 12 such that the additional fiber layer 12 is non-parallel to both the fiber layer 12. onto which it is placed and the longitudinal axis 15. Adjacent fiber layers 12 preferably are positioned at a relative angle of approximately 75° to 105°, with substantially perpendicularly being more preferred. The density of each fiber layer 12 can be different. The number of fiber layers 12 added on top of the tube 10 to form the cladding 6 is determined by the fuel designer to obtain a cladding 6 with a specific ductility or ultimate strength design value.

The composite ceramic cladding 6 may contain a balance of possible residual substances to reduce the friction coefficient between the layers 12 of ceramic fibers 8 or between the ceramic fibers 8. The anti-friction materials preferably have low neutron absorption cross-sections. Boron nitrates, boron carbide (B4C), and graphite are examples of such residual substances and may be used with the present invention. The anti-friction materials can be sprayed on one or more of the fibers 8 and/or of the fiber layers 12 rather than, or in conjunction with, the anti-friction materials being incorporated in the ceramic fiber material. Preferably, the mass of the anti-friction residual substances existing in the fibers 8 and/or sprayed on the fibers 8 and/or on the fiber layers 12 does not exceed 8% of the total mass of the fibers.

Figure 3:
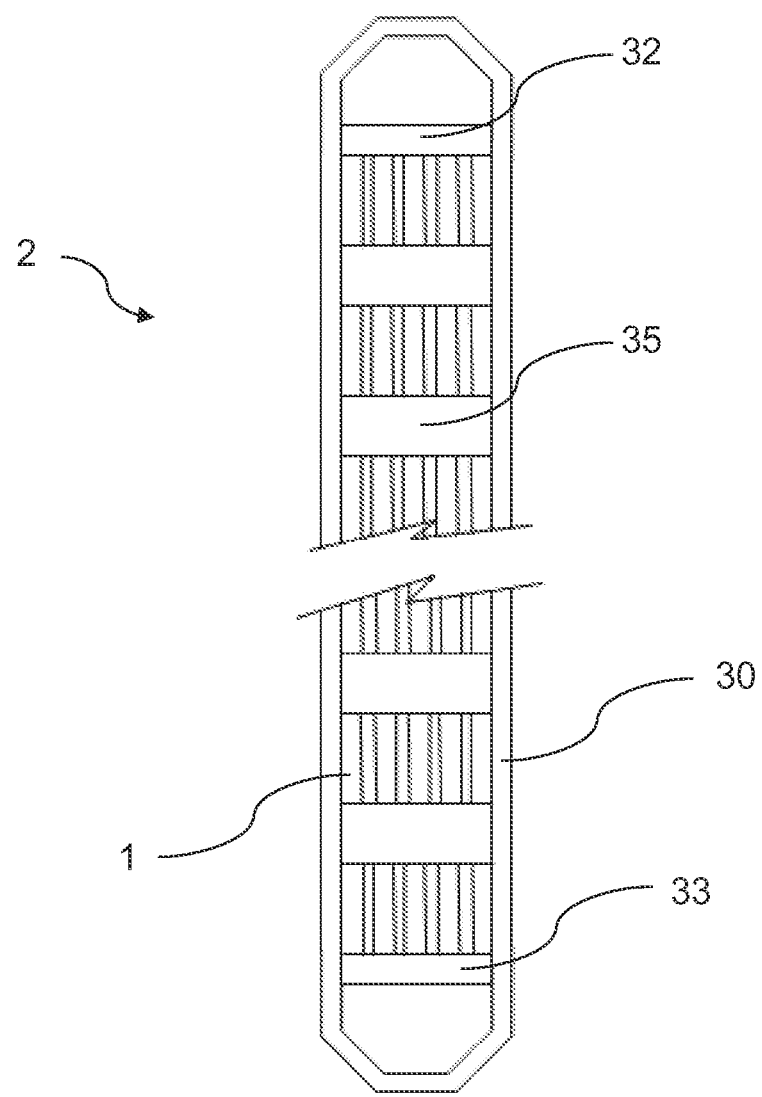
FIG. 3 shows a cross-sectional view of a nuclear fuel assembly of the present invention.

Preferably, the ceramic material of the composite fuel rod 1 consists essentially of silicon carbide. Silicon carbide has properties that reduce the problem of the permanent deformation of the claddings 6 of the fuel rods 1. Silicon carbide exhibits irradiation induced expansion in an amount that is approximately one-third that of zirconium alloys. Furthermore, the irradiation induced expansion of silicon carbide is predictable, in that the expansion is homogeneous in all directions; that is, the expansion is isotropic. Thus, use of silicon carbide to form the tubes 10 reduces the bending problem associated with known fuel rod claddings while increasing the dimensional stability of the fuel assembly 2, an example of which is illustrated in FIG. 3.

The use of silicon carbide, however, presents some challenges due to its low ductility and thermal conductivity. The fibers 8 provided about the tube 10 increase the ductility of the fuel rod cladding 6. The fibers 8 also strengthen the fuel rod cladding 6 by, for example, dissipating any energy driving crack formation and generating a pseudo-ductile failure mode of the composite.

Silicon carbide has much lower reaction rates with water in comparison with zirconium alloys used in known fuel cladding materials. The lower reaction rate beneficially eliminates corrosion as a concern during normal plant operation and allows for reaching higher maximum center fuel pellet temperature both during normal operations and during accident conditions. Silicon carbide has a neutron absorption cross section that is 30% smaller than known fuel cladding materials. This, together with higher allowable maximum center fuel pellet temperature, can compensate for its lower conductivity. Because the contribution of corrosion to the expansion and/or deformation of a silicon carbide composite material is small or negligible, the changing of the total fuel rod dimensions due to cladding corrosion is greatly reduced compared with zirconium alloy fuel claddings.

The use of silicon carbide as a cladding material also offers significant advantages for accident conditions. Chief among the advantages are the higher melting point (2700° C. versus 1750° C. for known fuel rods). The use of silicon carbide also avoids exothermic reactions with steam under severe accident conditions (at temperatures higher than 1400° C.). Up to 1500° C., the rate of reactions with steam is down by two orders of magnitude with respect to zirconium alloys. Therefore, a silicon carbide composite fuel rod cladding 6 would have better behavior than the known zirconium alloy fuel rod claddings, substantially reducing the probability of spreading its contents (fuel pellets 20) around the reactor vessel in case of a beyond design accident in a nuclear reactor.

The present invention provides a fuel rod cladding 6 with improved dimensional stability, and, in particular, reduced potential of inhomogeneous plastic deformation of the fuel rods 1 and the fuel assemblies 2. The present invention further provides a fuel rod cladding 6 with improved corrosion resistance relative to known fuel rod claddings. The present invention further provides a fuel rod 1 with greater integrity and resistance to beyond design accidents.

FIG. 3 shows a cross-sectional view of a nuclear fuel assembly 2 of the present invention. In the illustrated embodiment, the fuel assembly 2 is a fuel assembly for a boiling water reactor. The fuel assembly 2 includes a housing 30 inside of which several fuel rods 1 are arranged. The fuel rods 1 extend and are retained by upper and lower plates or nozzles 32, 33 respectively. One or more spacer grids 35 may be provided to support the fuel rods 1 along their length. Preferably, several spacer grids 35 are provided at regular intervals along the length of the fuel assembly 2. In use, the reactor coolant flows through the fuel assembly 2, contacting the outside surfaces of the individual fuel rods 1. Heat generated within the fuel pellets 20 is transmitted through the cladding 6 to the coolant. In this manner, heat is removed from the fuel assembly 2 and it can ultimately be converted into electricity.

Figure 4:
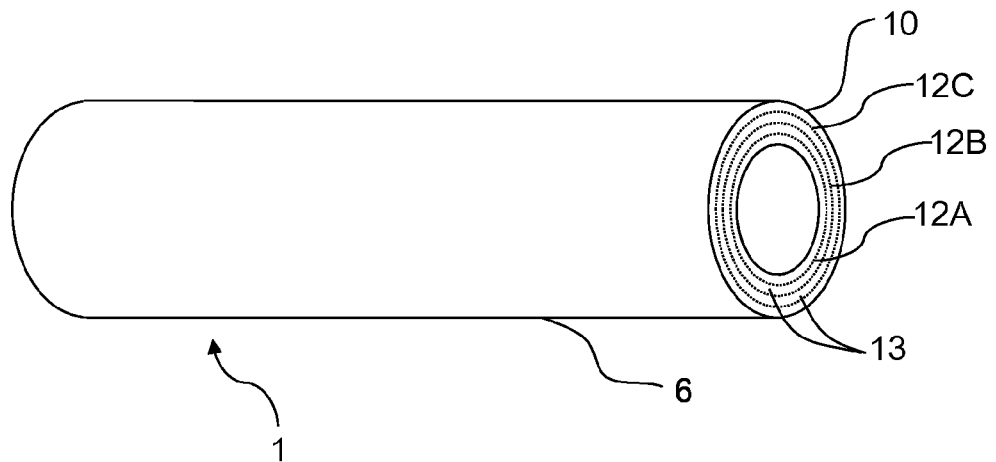
FIG. 4 shows a perspective view of a preferred composite fuel rod of the present invention.

FIG. 4 shows a perspective view of a fuel rod 1 according to a preferred embodiment of the present invention. In this embodiment, the fiber layers 12 are provided within the tube 10 and form an integral part thereof. The tube 10 may include multiple fiber layers 12 separated by layers 13 of solid ceramic material. A preferred spacing between subsequent fiber layers 12 is 1-2 mm radially. Each fiber layer 12 may actually be multiple fiber layers atop each other, with groupings of 3-10 fiber layers being preferred. The fiber layers 12 may be biased toward the tube inner diameter, in which case fiber layers 12 would be positioned at location 12A and not locations 12B or 12C. Similarly, the fiber layers 12 may be biased toward the tube outer diameter, in which case fiber layers 12 would be positioned at location 12C and not locations 12A or 12B. If the fiber layers 12 are to be distributed substantially equally spaced (radially) throughout the tube 10, they would be positioned at each of locations 12A, 12B, and 12C. In this embodiment, the fiber layer(s) 12 are positioned as desired during fabrication of the tube 10, with one or more layers 13 of solid ceramic material placed atop the fiber layers 12.

Figure 5:
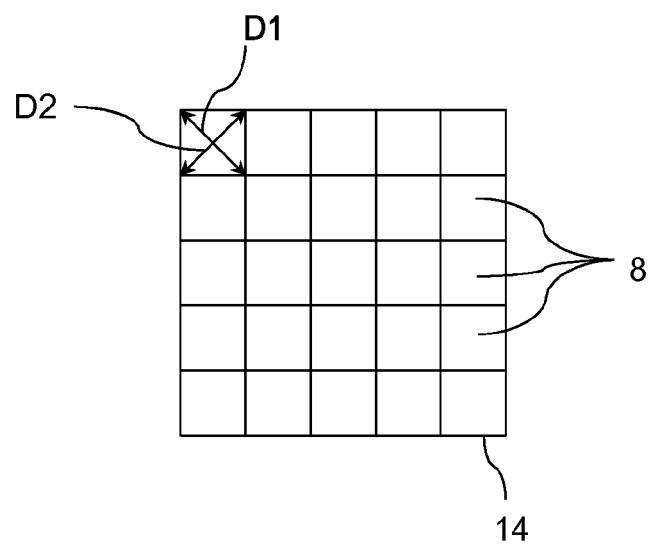
FIG. 5 illustrates a fiber mesh of the present invention.

In lieu of individual fibers 8, a mesh can be used. FIG. 5 illustrates a fiber mesh 14 of the present invention. The fiber mesh 14 includes a plurality of fibers 8 arranged in a grid pattern. An aspect ratio of the grid, defined by first grid diagonal D1 divided by a second grid diagonal D2, preferably ranges from 1 to 5.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A nuclear fuel rod, comprising an elongate hollow cladding configured to retain a nuclear fuel therein, the cladding comprising:
an elongate hollow tube including a first tubular fiber layer, a tubular solid ceramic material layer surrounding the first tubular fiber layer and a second tubular fiber layer surrounding the solid tubular ceramic material layer, each of the first tubular fiber layer and the second tubular fiber layer comprising at least one fiber formed of a ceramic material arranged into a tube shape.

2. The nuclear fuel rod of claim 1, wherein the tubular solid ceramic material layer is formed of silicon carbide.

3. The nuclear fuel rod of claim 1, wherein the first tubular fiber layer, the tubular solid ceramic material layer and the second tubular fiber layer are formed of the same ceramic material.

4. The nuclear fuel rod of claim 1, wherein each of the first tubular fiber layer and the second tubular fiber layer is made of a plurality of fibers.

5. The nuclear fuel rod of claim 4, wherein said plurality of fibers form an integral mesh.

6. The nuclear filet rod of claim 5, wherein said mesh has an aspect ratio within the range of 1 to 5.

7. The nuclear fuel rod of claim 1, wherein the first tubular fiber layer and the second tubular fiber layer are positioned within said cladding between an inner surface and an outer surface of said cladding.

8. The nuclear fuel rod of claim 7, wherein the first tubular fiber layer is positioned closer to an inner diameter surface of said cladding than to an outer diameter surface of said cladding.

9. The nuclear fuel rod of claim 7, wherein the second tubular fiber layer is positioned closer to an outer diameter surface of said cladding than to an inner diameter surface of said cladding.

10. The nuclear fuel rod of claim 1, wherein each of the first tubular fiber layer and the second tubular fiber layer includes a plurality of individual fiber layers positioned such that adjacent ones of said individual fiber layers of the respective first tubular fiber layer and the second tubular fiber layer are non-parallel.

11. The nuclear fuel rod of claim 10, wherein adjacent ones of said individual fiber layers form a relative angle of 75° to 105°.

12. The nuclear fuel rod of claim 1, wherein each of the first tubular fiber layer and the second tubular fiber layer includes a plurality of individual fiber layers and said tube has a longitudinal axis and the individual ones of said plurality of fiber layers are positioned such that none of said individual ones is parallel to said longitudinal axis.

13. The nuclear fuel rod of claim 1, wherein the first tubular fiber layer and the second tubular fiber layer form an integral part of said tube.

14. The nuclear fuel rod of claim 1, wherein said cladding comprises a residual substance to reduce a friction coefficient of said fiber.

15. The nuclear fuel rod of claim 14, wherein a mass of said residual substance does not exceed 8% of a total mass of said fiber.

16. The nuclear fuel rod of claim 14, wherein said residual substance is an integral component of said fiber.

17. The nuclear fuel rod of claim 14, wherein said residual substance includes boron or graphite.

18. The nuclear fuel rod of claim 1, wherein said tube has a longitudinal axis and at least one of the first tubular fiber layer and the second tubular fiber layer is positioned such that the at least one fiber thereof forms an angle of 30° to 70° relative to said longitudinal axis.

19. A nuclear fuel assembly for a light water reactor, comprising:

a plurality of nuclear fuel rods, each of said fuel rods comprising an elongate hollow cladding, the cladding including:

an elongate hollow tube including a first tubular fiber layer, a tubular solid ceramic material layer surrounding the first tubular fiber layer and a second tubular fiber layer surrounding the solid tubular ceramic material layer, each of the first tubular fiber layer and the second tubular fiber layer comprising at least one fiber formed of a ceramic material arranged into a tube shape.

20. The nuclear fuel assembly of claim 19, wherein the tubular solid ceramic material layer is formed of silicon carbide.

21. The nuclear fuel assembly of claim 19, wherein the first tubular fiber layer, the tubular solid ceramic material layer and the second tubular fiber layer are formed of the same ceramic material.

22. The nuclear fuel assembly of claim 19, wherein said plurality of fibers form an integral mesh.

23. The nuclear fuel assembly of claim 19, wherein said cladding comprises a residual substance to reduce a friction coefficient of said fibers.

24. The nuclear fuel assembly of claim 1, wherein the elongate hollow tube further incudes a further tubular solid ceramic material layer surrounding the second tubular fiber layer and a third tubular fiber layer surrounding the further solid tubular ceramic material layer.

* * * * *